United States Patent
Hasegawa et al.

(10) Patent No.: US 10,096,338 B2
(45) Date of Patent: Oct. 9, 2018

(54) DATA RECORDING APPARATUS AND DATA RECORDING METHOD

(71) Applicant: KABUSHIKI KAISHA TOSHIBA, Tokyo (JP)

(72) Inventors: Hitoshi Hasegawa, Kawasaki Kanagawa (JP); Kenji Yoshida, Kamakura Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/447,118

(22) Filed: Mar. 2, 2017

(65) Prior Publication Data

US 2018/0090168 A1    Mar. 29, 2018

(30) Foreign Application Priority Data

Sep. 29, 2016   (JP) .................. 2016-191393

(51) Int. Cl.
  *G11B 5/09*     (2006.01)
  *G11B 20/12*    (2006.01)
  *G11B 5/012*    (2006.01)
  *G11B 20/10*    (2006.01)

(52) U.S. Cl.
  CPC .......... *G11B 20/1217* (2013.01); *G11B 5/012* (2013.01); *G11B 5/09* (2013.01); *G11B 20/10009* (2013.01); *G11B 2020/1238* (2013.01)

(58) Field of Classification Search
  CPC ............... G11B 27/36; G11B 20/1253; G11B 20/10527; G11B 20/1879; G11B 2020/10657; G11B 2020/183; G11B 5/09; G11B 5/02
  USPC .......................................... 360/48
  See application file for complete search history.

(56) References Cited

U.S. PATENT DOCUMENTS

| | | | |
|---|---|---|---|
| 9,007,710 B1 | 4/2015 | Liu et al. | |
| 9,111,578 B1 | 8/2015 | Hassel et al. | |
| 9,286,936 B1 | 3/2016 | Poudyal et al. | |
| 9,336,819 B2 * | 5/2016 | Cho .................. | G11B 20/1879 |
| 9,454,991 B2 * | 9/2016 | Sutardja .............. | G06F 12/0897 |

\* cited by examiner

*Primary Examiner* — Nabil Hindi
(74) *Attorney, Agent, or Firm* — Patterson & Sheridan, LLP (57) ABSTRACT

A data recording apparatus includes a disk, a read/write head, and a control circuit configured to control the head to perform reading of first data on the disk according to a first format and writing of second data to the disk according to a second format, wherein the second data is generated by compressing at least a part of the first data, and the second format is determined according to a data size of the second data.

20 Claims, 4 Drawing Sheets

DATA RECORDING APPARATUS AND DATA RECORDING METHOD

CROSS-REFERENCE TO RELATED APPLICATION

This application is based upon and claims the benefit of priority from Japanese Patent Application No. 2016-191393, filed Sep. 29, 2016, the entire contents of which are incorporated herein by reference.

FIELD

Embodiments described herein relate to a data recording apparatus and a data recording method which record data in a recording medium.

BACKGROUND

A data recording apparatus which uses a magnetic disk as a recording medium includes a hard disk drive (HDD). In some cases, the HDD employs a shingled magnetic recording method. In the shingled magnetic recording method, new data is recorded to overlap with a part of the data previously recorded by a write head. On the magnetic disk, a track is formed by data recorded by the write head. That is, on the magnetic disk provided in an HDD which employs the shingled magnetic recording method, a first track and a second track that overlaps with a part of the first track are included.

In the HDD, there is a case where data to be recorded is compressed and the compressed data is recorded on the magnetic disk. Therefore, the data recorded on the magnetic disk may be compressed at an arbitrary compression rate. The compressed data is read and then expanded to return to original data to be recorded.

DETAILED DESCRIPTION

Embodiments provide a data recording apparatus and a data recording method which appropriately record compressed data.

A data recording apparatus according to an embodiment includes a disk, a read/write head, and a control circuit configured to control the head to perform reading of first data on the disk according to a first format and writing of second data to the disk according to a second format, wherein the second data is generated by compressing at least a part of the first data, and the second format is determined according to a data size of the second data.

Hereinafter, embodiments will be described with reference to the drawings. However, the present invention is not limited by the drawings of the embodiments to be described below.

Figure 1:
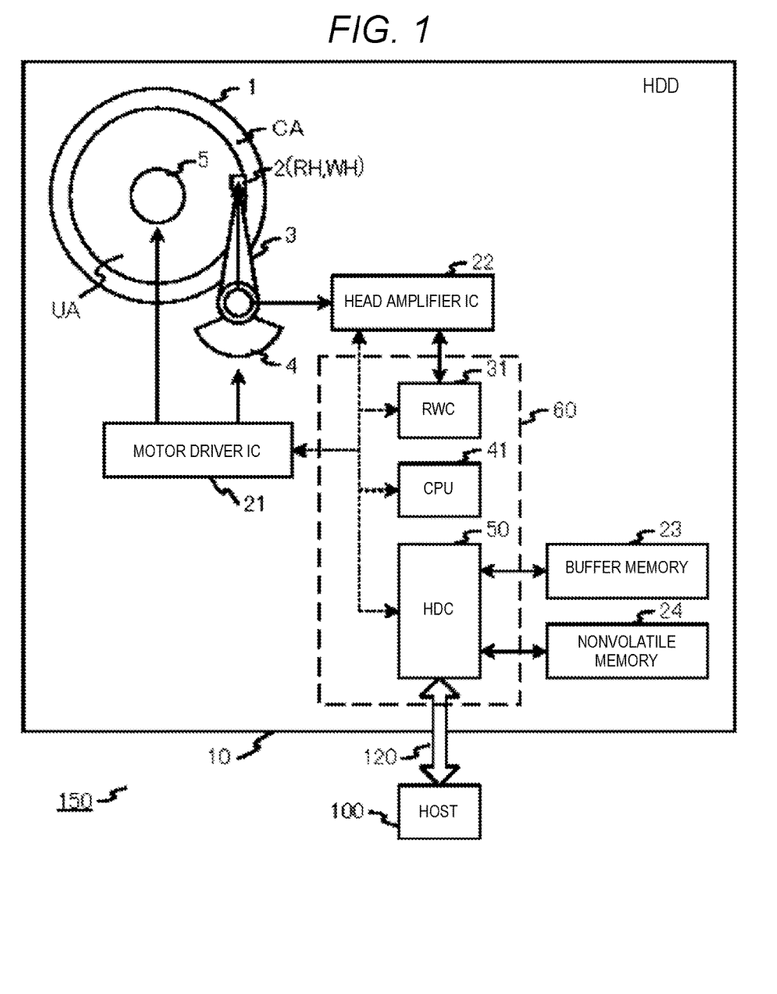
FIG. 1 is a block diagram illustrating a configuration of an electronic system including a hard disk drive (HDD) as a disk device according to an embodiment.

FIG. 1 is a block diagram illustrating a configuration of an electronic system 150 including a hard disk drive 10 (hereinafter, also referred to as an "HDD") as a disk device according to an embodiment. The electronic system 150 includes a host 100 and an HDD 10. A host I/F 120 is used to connect the host 100 and the HDD 10 to each other and transmit and receive a command, user data, a command response, and reports of status between the host 100 and the HDD 10. The host I/F 120 complies with serial advanced technology attachment (SATA) standard or serial attached SCSI (SAS) standard. The HDD 10 is connected to the host 100 through the host I/F 120 to function as a disk device of the host 100. For example, the electronic system 150 is a personal computer, a mobile device, or a server device. For example, the host 100 is a chip set IC provided in the personal computer or the mobile device or a server controller provided in the server device.

The HDD 10 includes a head disk assembly (HDA) including a magnetic disk 1, a slider 2, an arm 3, a voice coil motor (VCM) 4, and a spindle motor (SPM) 5. Further, the HDD 10 includes a circuit block including a motor driver IC (hereinafter, also referred to as a "driver IC") 21, a head amplifier IC 22, a buffer memory 23, a nonvolatile memory 24, and a controller 60.

The controller 60 includes a read/write channel (hereinafter, also referred to as an "RWC") 31, a CPU 41, and a hard disk controller (hereinafter, also referred to as an "HDC") 50. The buffer memory 23 is a volatile memory which is capable of transmitting data at a higher speed than the magnetic disk 1 and a DRAM (SDRAM) or an SRAM is applied as the buffer memory 23. The nonvolatile memory 24 is a nonvolatile recording unit and a semiconductor memory such as a NOR type or NAND type flash memory or a part of a recording region of the magnetic disk 1.

The HDD 10 according to the embodiment executes a processing of recording data on the magnetic disk 1 (a write processing or process), a processing of reading data recorded on the magnetic disk 1 (a read processing or process), and a processing of compressing data to be recorded on the magnetic disk 1 and expanding data read from the magnetic disk 1 (a compression/expansion processing or process). The write processing, the read processing, and the compression/expansion processing are executed according to a command transmitted from the host 100 or an internal request within the HDD 10. These processes are controlled according to a software program (firmware) executed by the CPU 41. Data of the software program is stored in a non-volatile manner in the nonvolatile memory 24.

The magnetic disk 1 rotates by the SPM 5. The SPM 5 is controlled to rotate by a driving voltage or a driving current from the driver IC 21. The arm 3 and the VCM 4 make up an actuator. The slider 2 includes a head and is mounted on one end of the arm 3. The actuator moves (seeks) the head provided on the slider 2 to a target position on the magnetic disk 1. That is, the actuator moves the slider 2 (head) mounted on the arm 3 in a radial direction on the disk 1 by driving of the VCM 4. The VCM 4 is controlled by a driving voltage or a driving current from the driver IC 21.

The magnetic disk 1 includes a recording surface and data is recorded on the recording surface to form a cylinder (a data track or simply a track). That is, the magnetic disk 1 is configured as a recording medium provided with a recording region to record data. The recording surface of the magnetic disk 1 includes a servo area where servo data is recorded to control a position of the head on the recording surface, a system area to record system data, a user area UA to record user data transmitted from the host 100, and a cache area CA. For example, the servo data is recorded during a manufacturing process of the HDD 10, and is not recorded after shipment. The system data includes data to be managed during the write processing and the read processing executed by the HDD 10. The system data may be recorded not in the system area of the magnetic disk 1 but in the nonvolatile memory 24. The user data includes not only data which is transmitted from the host 100 and recorded therefrom, but also data which is recorded in advance in the user area UA or the cache area CA and data which is read from the user area UA or the cache area CA. Hereinafter, the user data may be simply referred to as data.

In the user area UA, data may be recorded using a shingled magnetic recording method. The shingled magnetic recording method refers to a method in which new data is recorded to overlap with a part of previously recorded data (overwritten on a part of the previously recorded data). That is, the magnetic disk 1 recorded by the shingled magnetic recording method at least includes a first track and a second track that overlaps with a part of the first track. Recording density in the radial direction of the magnetic disk 1 (track density) (also referred to as tracks per inch (TPI)) may be increased by employing the shingled magnetic recording method. In the shingled magnetic recording method, a track group (hereinafter, also referred to as a "track band" or simply referred to as a "band") including a plurality of tracks is defined. In this band, new data is recorded (a new track is formed) to overlap with apart of the data of a previously recorded track. However, in this case, data of the track in one band is recorded so as not to overlap with data of a track in another band that is adjacent in the radial direction. That is, bands that are adjacent to each other in the radial direction are spaced apart from each other. In each band, data is recorded in one direction to be physically continuous in the radial direction. It does not matter which one of two adjacent bands is recorded first. Logical addresses of user data which is recorded within the band is preferably continuous. That is, within the band, data of continuous logical address is recorded to overlap with a part of the previously recorded data, and thus the band may be referred to as or defining a logical and physical recording unit. In the embodiment, user data may be compressed in some cases so that the data quantity is reduced (the data length is shortened) to be recorded in each band.

The cache area CA is provided in an area at an outer periphery side of the magnetic disk 1, for example. The cache area CA is a nonvolatile cache area where user data transmitted from the host 100 is temporarily recorded before the user data is recorded in the user area UA. The cache area CA provided in the magnetic disk 1 is also referred to as a media cache. Further, the media cache may be provided in an intermediate area to divide an area at an inner periphery of the magnetic disk 1 or the user area UA. Even though a logical address is not allocated in advance to the cache area CA (i.e., mapped to a physical address of the cache area), the correspondence relationship thereof is temporarily managed as the user data is temporarily recorded in the cache area CA. For example, when a plurality of write requests to write a plurality of user data whose logical addresses are discontinuous are received from the host 100, the plurality of received user data is temporarily recorded in the media cache. Thereafter, the user data temporarily recorded in the media cache is recorded in a band to be recorded with the user data of the logical addresses at a predetermined timing (e.g., an idle time). In this case, the logical addresses of the user data correspond to the physical addresses in the band which is newly recorded from the physical addresses of the cache area CA. The user data recorded in the media cache may be recorded by the shingled magnetic recording method or not. When the user data is recorded by the shingled magnetic recording method, the total amount of data recorded within a disk is increased. In contrast, when the data is recorded by a non-shingled magnetic recording method by which data recorded does not overlap, the reliability of the recorded data is improved. Any of the recording methods may be employed as long as a specification required for the HDD 10 is met.

The head provided in the slider 2 includes a read head RH and a write head WH. The read head RH reads recorded data based on the cylinder on the magnetic disk 1. The read data includes servo data, user data, and system data. The write head WH writes the user data and the system data on the magnetic disk 1. Even though a single magnetic disk 1 and a single head are illustrated in FIG. 1, the HDD 10 may include a plurality of magnetic disks 1 and a plurality of heads corresponding to recording surfaces of a plurality of magnetic disks 1. Further, the cache area CA may be provided on the recording surface of each of the plurality of magnetic disks 1.

The head amplifier IC 22 includes a read amplifier and a write driver (both are not illustrated). The read amplifier amplifies a read signal read by the read head RH and outputs the amplified read signal to the RWC 31. The write driver outputs a write current according to the write data output from the RWC 31, to the write head WH.

The controller 60 is configured with one-chip integrated circuit which at least includes the RWC 31, the CPU 41, and the HDC 50 that are integrated therein. The buffer memory 23 and the nonvolatile memory 24 may be connected outside of the controller 60, or may be provided in the controller 60.

The RWC 31 includes a read channel and a write channel (both are not illustrated). The read channel processes the amplified read signal output from the head amplifier IC 22 to decode data including at least servo data and user data. The RWC 31 executes processes regarding the detection and correction of an error of the user data and generates information to determine the quality of the user data, at the read channel. This information may be transmitted to the CPU 41. The write channel outputs write data obtained by encoding data to be written which is provided from the HDC 50, to the head amplifier IC 22.

The HDC 50 controls the buffer memory 23 to control data transmission between the host 100 and the RWC 31. The HDC 50 temporarily stores the read data and the write data in the buffer memory 23 to control the data transmission. The read data is user data read from the magnetic disk 1 and the write data is user data to be written on the magnetic disk 1. Further, the HDC 50 executes the compression/expansion processing on the read data, the write data, or the system data. The HDC 50 may use the buffer memory 23 as a work memory during the compression/expansion processing. The HDC 50 controls the nonvolatile memory 24 and writes and reads, for example, a software program executed by the CPU 41 or system data. The HDC 50 is configured to include an interface circuit which controls transmission/reception of at least a command and data between the host 100 and the HDD 10.

The CPU 41 is an IC which is called a microprocessor or a micro controller. The CPU 41 controls the VCM 4 through the driver IC 21 to execute a positioning control (servo control) of the head. Further, the CPU 41 controls the write processing and the read processing on the magnetic disk 1 through the RWC 31. During the write processing and the read processing, the CPU 41 controls the compression/expansion processing on data to be processed, through the HDC 50. The CPU 41 uses the above-described HDA and circuit block according to the software program to control the plurality of processes. The CPU 41 is configured with a controller or a control circuit that controls the plurality of processes.

That is, with the above-described configuration, the HDD 10 according to the embodiment executes the plurality of processes which will be described in detail below.

Figure 2:
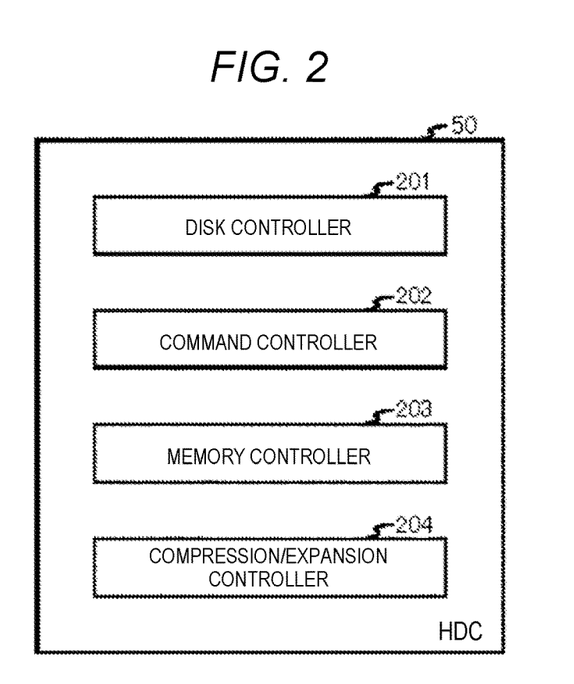
FIG. 2 is a view illustrating a plurality of functional units provided in an HDC of the HDD according to the embodiment.

Next, an operation of the HDC 50 will be described with reference to FIG. 2. FIG. 2 is a view illustrating a plurality of functional units provided in the HDC 50 of the HDD 10 according to the embodiment.

In the embodiment, the HDC 50 includes a disk controller 201, a command controller 202, a memory controller 203, and a compression/expansion controller 204. These functional units cooperate with the HDA and the circuit block provided in the HDD 10 and are controlled by a controller which is implemented by the CPU 41 according to a software program. These functional units are connected to each other or specific functional units are connected to each other, by an internal bus (not illustrated) which is commonly or individually connected, in the HDC 50. Further, each of these functional units includes a circuit configured to implement the function thereof.

The disk controller 201 is connected to the RWC 31 to execute a processing on data input from the RWC 31 and data output to the RWC 31 according to the control by the CPU 41 (controller). After processing the data input from the RWC 31, the disk controller 201 outputs the processed data to the memory controller 203 or the compression/expansion controller 204. The disk controller 201 processes the data input from the memory controller 203 or the compression/expansion controller 204 and then outputs the processed data to the RWC 31. For example, the disk controller 201 executes the write processing or the read processing on the magnetic disk 1 as the command controller 202 receives a command from the host 10. The disk controller 201 executes a processing on write data during the write processing, a processing on read data during the read processing, and a processing on servo data required to control the servo. Further, the disk controller 201 notifies the CPU 41 or the compression/expansion controller 204 of an execution request of the compression/expansion processing (herein, specifically, expansion processing) on the data input from the RWC 31.

The command controller 202 is connected to the host 100 to execute processes on a command and user data transmitted from the host 100 or a command response, a report of a status, and user data output to the host 100, according to the control by the CPU 41 (controller). The command controller 202 processes the data transmitted from the host 100 and then outputs the processed data to the memory controller 203 or the compression/expansion controller 204. The command controller 202 processes the data input from the memory controller 203 or the compression/expansion controller 204 and then outputs the processed data to the host 100. The command controller 202 outputs the information related to the processes to the CPU 41 (controller). The command controller 202 includes a circuit configured to transmit/receive the command, the user data, the command response, and the report of the status between the command controller 202 and the host 100. The command controller 202 notifies the disk controller 201, the memory controller 203, or the compression/expansion controller 204 of an execution request of a processing according to a command input from the host 100 through the circuit, or an execution request of an internal processing in the HDD 10. Further, the command controller 202 generates a response command and outputs the response command through the above-described circuit, according to a result of the processing in the disk controller 201, the memory controller 203, or the compression/expansion controller 204. The command controller 202 notifies the CPU 41 or the compression/expansion controller 204 of an execution request of the compression/expansion processing (here, compression processing) on the user data on the write request input from the host 100.

The memory controller 203 controls transmission/reception of data transmitted between each functional units in the HDC 50, the buffer memory 23 and the nonvolatile memory 24, according to the control by the CPU 41 (controller). The memory controller 203 includes a circuit configured to transmit/receive data to/from the buffer memory 23 and the nonvolatile memory 24. This circuit may be common to the buffer memory 23 and the nonvolatile memory 24 or a circuit for the buffer memory 23 and a circuit for the nonvolatile memory 24 may be separately provided. For example, the memory controller 203 controls data which is processed during the compression/expansion processing executed by the compression/expansion controller 204 to be transmitted between the compression/expansion controller 204 and the buffer memory 23. In this case, the memory controller 203 controls data to be transmitted to the buffer memory 23, based on an execution request from the compression/expansion controller 204.

The compression/expansion controller 204 executes a processing of compressing and expanding data (compression/expansion processing), according to the control by the CPU 41 (controller). The compression/expansion processing includes a compression processing of compressing data, an expanding processing of expanding data, and a processing of generating management information related to the compression processing. The compression/expansion controller 204 includes a circuit configured to execute the compression processing and a circuit configured to execute the expanding processing. For example, the compression/expansion controller 204 executes the expanding processing on data input from the RWC 31. The data input from the RWC 31 is transmitted to the buffer memory 23 to be buffered and then supplied to the compression/expansion controller 204, according to the control of the memory controller 203. When the provided data is compressed data, the compression/expansion controller 204 executes the expanding processing on the compressed data. When the provided data is non-compressed data, the compression/expansion controller 204 does not execute the expanding processing. The compression/expansion controller 204 provides the non-compressed data generated by the expanding processing or the supplied non-compressed data to the command controller 202 through the memory controller 203. The compression/expansion controller 204 uses the buffer memory 23 as a work memory based on the control of the memory controller 203, in order to execute the expansion processing on the compressed data. The compression/expansion controller 204 determines whether the data input from the RWC 31 is compressed data or non-compressed data, based on management information related to input data.

Further, for example, the compression/expansion controller 204 executes the compression processing on user data transmitted from the host 100, according to the notification of an execution request from the command controller 202. The data transmitted from the host 100 is non-compressed data. For example, the non-compressed data transmitted from the host 100 is transmitted to the buffer memory 23 to be buffered based on the control of the memory controller 203 and then provided to the compression/expansion controller 204. The compression/expansion controller 204 may execute the compression processing on the provided non-compressed data and provide the compressed data to the disk controller 201 through the memory controller 203. Further, the non-compressed data transmitted from the host 100 may directly be provided to the compression/expansion controller 204. The compression/expansion controller 204 may use the buffer memory 23 as a work memory based on the control of the memory controller 203, in order to execute the compression processing on the non-compressed data.

The compression/expansion controller 204 generates management information related to the executed compression processing for every compression processing following the execution of the compression processing on the non-compressed data. The management information is also referred to as header data. The management information includes at least one of information indicating whether the compression processing is successful (and compressed) or unsuccessful (and remains uncompressed), information indicating a compression rate, a starting logical address of compressed data and the length of the logical address, and a data length before/after the compression processing. The compression/expansion controller 204 provides the generated management information to the disk controller 201 together with the corresponding compressed data. Further, the compression/expansion controller 204 calculates a compression rate when the compression processing is executed on the non-compressed data (a ratio obtained by the data length of compressed data after compression plus the data length of the management information, divided by the data length of the non-compressed data before compression), according to the control by the CPU 41 (controller). In order to calculate the compression rate, the compression/expansion controller 204 actually executes the compression processing on the non-compressed data to obtain the data length before the compression processing (that is, a data length of non-compressed data) and the data length after the compression processing (that is, a data length of the compressed data). The compression/expansion controller 204 calculates the compression rate per one or multiple times of compression processes. During the one compression processing, data having a fixed length may be compressed, but data having a variable length may also be compressed. When the data having a fixed length is compressed, the compression/expansion controller 204 does not need to obtain the data length before the compression processing whenever the compression rate is calculated, and may maintain the data length as a fixed value. For example, the fixed length may be a unit data length (for example, 512 B, 4 KB, or a natural number multiple thereof, according to a sector length which is a unit of data transmission from the host 100) for encoding which is executed by the RWC 31 or a data quantity (data length) of one band in the shingled magnetic recording method. When the data having a variable length is compressed, the CPU 41 specifies the length of the data to be compressed to the compression/expansion controller 204. The compression/expansion controller 204 provides the information related to the calculated compression rate to the CPU 41 (controller). As described above, the compression rate is a value represented by a ratio of a data length of the non-compressed data before compression and a data length of the compressed data after compression. For example, the compression rate is a multiplying factor of a data quantity after compression when it is assumed that a data quantity before compression is 1. Specifically, when the data quantity before compression is 500 [MB] and the data quantity after compression is 400 [MB], the compression rate is 0.8 times (80%). The data quantity after compression is significantly smaller than the data quantity before compression, so that the compression rate is smaller than one time (100%). Here, it is defined that the smaller a value of the compression rate is, the higher the compression rate is and the larger the value of the compression rate is, the lower the compression rate is. For example, a compression rate in a case where 500 [MB] is compressed to 200 [MB] (a compression rate is 0.4 times) is higher than a compression rate in a case where 500 [MB] is compressed to 400 [MB] (a compression rate is 0.8 times).

As described above, a partial processing of the compression/expansion processing according to the embodiment is executed by a plurality of functional units provided in the HDC 50, based on the control by the CPU 41 (controller).

Figure 3:
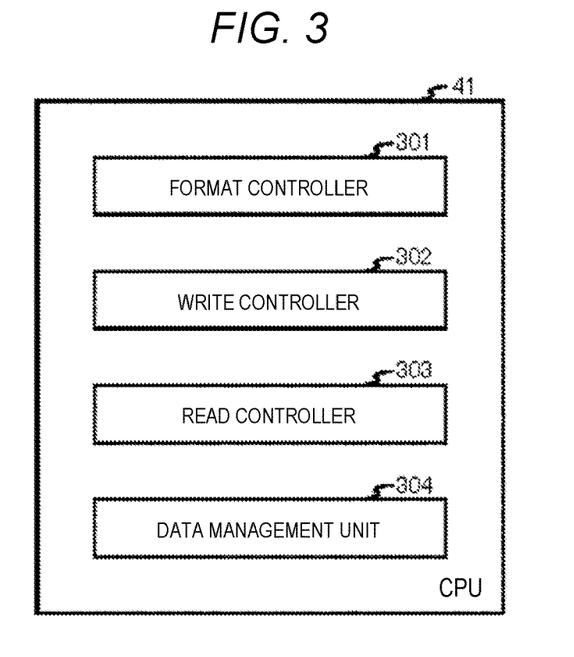
FIG. 3 is a view illustrating a plurality of functional units implemented by a CPU of the HDD according to the embodiment.

Next, an operation of the CPU 41 will be described with reference to FIG. 3. FIG. 3 is a view illustrating a plurality of functional units implemented by the CPU 41 of the HDD 10.

The CPU 41 executes a software program to implement a plurality of functional units. The CPU 41 includes a format controller 301, a write controller 302, a read controller 303, and a data management unit 304. The functional units control the functional units in the HDC 50 that are described with reference to FIG. 2. The functional units provided in the CPU 41 execute various processes in cooperation with the HDA or the circuit block provided in the HDD 10.

The format controller 301 controls a processing of determining a format of the magnetic disk 1. The format of the magnetic disk 1 includes at least any of TPI, a recording density in a circumferential direction of a track formed in the magnetic disk 1 (bit density or also referred to as bits per inch (BPI)), and a specification of the shingled magnetic recording method. The specification of the shingled magnetic recording method includes the number of tracks in one band and a data quantity of each track in one band. The format controller 301 may determine the specification of the shingled magnetic recording method to be different from band to band or track to track. The format controller 301 provides information related to the determined format to the write controller 302, the read controller 303, or the data management unit 304. When the data length of the non-compressed data on which the compression processing is executed is variable, the format controller 301 determines a data length to execute the compression processing as a format of the disk 1 to provide the determined data length to the compression/expansion controller 204 in the HDC 50. Further, the format controller 301 receives information related to the compression rate from the compression/expansion controller 204 to determine the format of the magnetic disk 1 based on the received information. In the embodiment, the format controller 301 determines a format when the compressed data is written. Since the data quantity of the compressed data is smaller than that of the corresponding non-compressed data, the format controller 301 may determine a format which is more relaxed than a format when the non-compressed data is written. That is, the format controller 301 changes the format of the magnetic disk 1 to be relaxed more than the format when the non-compressed data is written, in order to write the compressed data. Further, the format controller 301 may determine the format of the magnetic disk 1 according to surrounding conditions (for example, temperature, humidity, or atmospheric pressure) of the HDD 10. Further, the format controller 301 may be configured such that the changed amount of the format of the magnetic disk 1 is set by the host 100.

The write controller 302 controls a write processing of data on the magnetic disk 1 by the disk controller 201 in the HDC 50. The write controller 302 controls the write processing according to information input from the command controller 202 in the HDC 50 or information supplied from the data management unit 304. The write controller 302 exchanges information for controlling the write processing with the data management unit 304. The write controller 302 controls the write processing based on the recording method (the shingled magnetic recording method or non-shingled magnetic recording method). In the case of the normal write processing, new data is recorded so as not to overlap with previously recorded data (so as not to be overwritten on apart of the previously recorded data). The write controller 302 controls the write processing based on the information related to the format input from the format controller 301.

The read controller 303 controls the data read processing on the magnetic disk 1 by the disk controller 201. The read controller 303 controls the read processing according to a request from the data management unit 304. The read controller 303 exchanges information for controlling the read processing with the data management unit 304. The read controller 303 controls the read processing based on the information related to the format input from the format controller 301.

The data management unit 304 manages information related to the user data to be recorded on the magnetic disk 1 or the recorded user data. For example, the data management unit 304 manages a correspondence relationship between a logical address of the user data to be recorded and a physical address to specify a recording position on the magnetic disk 1 during the write processing which is controlled by the write controller 302. The data management unit 304 manages the correspondence relationship using, for example, an address management table (hereinafter, also simply referred to as an "address table"). When user data of an arbitrary logical address is recorded in a new physical address which is different from the current physical address during the write processing, the data management unit 304 updates the address table by the correspondence relationship between the arbitrary logical address and the new physical address. Further, the data management unit 304 determines the physical address of a target user data to be read from the magnetic disk 1 based on the logical address of the user data and the address table during the read processing controlled by the read controller 303. In the address table, the user data recorded in the user area UA or the cache area CA is managed.

Further, the data management unit 304 requests the read controller 303 and the write controller 302 to execute a processing of rewriting the user data temporarily recorded in the cache area CA to a predetermined recording position in the user area UA. Further, as the data is recorded on the magnetic disk 1, the data management unit 304 manages the number of recording times of the data in the recording position or a periphery of the recording position. The data management unit 304 may manage the number of recording times, in the unit of a single track or a plurality of tracks. When the number of recording times in an arbitrary recording position is equal to or larger than a predetermined threshold, the data management unit 304 requests the read controller 303 and the write controller 302 to execute a processing of rewriting data recorded in the recording position or the periphery of the recording position. Since the embodiment employs the shingled magnetic recording method, the data management unit 304 receives information related to the format of the magnetic disk 1 including a specification of the shingled magnetic recording method from the format controller 301 when the rewrite processing is executed. The data management unit 304 provides the information related to the received format to the read controller 303 and the write controller 302.

As described above, the plurality of processes according to the embodiment is controlled by the plurality of functional units which is implemented by the CPU 41.

Figure 4:
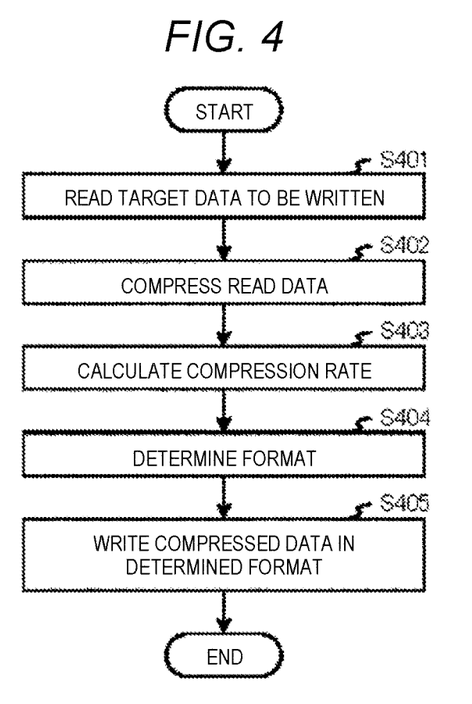
FIG. 4 is a flowchart illustrating an example of a process executed by the HDD according to the embodiment.

Next, a process executed by the HDD 10 according to the embodiment will be described with reference to FIG. 4. FIG. 4 is a flowchart illustrating an example of processes executed by the HDD 10 according to the embodiment.

The flowchart illustrated in FIG. 4 illustrates a flow of a processing of writing data obtained by compressing data to be written (hereinafter, simply referred to as "target data") using a new format. This processing includes executing a plurality of processes after reading data recorded on the magnetic disk 1 and before writing the processed data on the magnetic disk 1 again using a new format. This processing is mainly executed by the plurality of functional units provided in the HDC 50, according to the control by the CPU 41.

First, the CPU 41 (in particular, the data management unit 304) specifies a physical address on the magnetic disk 1 recorded with the target data based on the address table, and transmits the information of the physical address to the read controller 303. The read controller 303 reads the target data based on, for example, the received information of the physical address (S401). When the target data is to be distributed on the magnetic disk 1, the data management unit 304 may transmit a plurality of distributed physical addresses to the read controller 303. The read controller 303 buffers the read data in the buffer memory 23 through the memory controller 203. As the read data is buffered in the buffer memory 23, the compression/expansion controller 204 obtains the target data from the buffer memory 23 through the memory controller 203, and executes the compression processing on the obtained target data (which is not compressed). That is, the compression/expansion controller 204 compresses the target data read by the read controller 303 (S402). Here, the target data may be, for example, data of one track, data of an execution unit of the decode processing in the RWC 31, or data of one band. Further, in this embodiment, it is assumed that the target data originally recorded on the magnetic disk 1 is non-compressed data. However, when the target data originally recorded on the magnetic disk 1 is compressed data, the obtained compressed data may be used without executing the compression processing on the read data. When the compression/expansion controller 204 uses the buffer memory 23 as a work memory to execute the compression processing on the target data, the compressed target data is stored in the buffer memory 23 based on the control of the memory controller 203.

The compression/expansion controller 204 obtains a data length of target data which is not compressed before the compression processing on the target data. The compression/expansion controller 204 may obtain information related to the data length before compressing the target data from the read controller 303, the memory controller 203, or the CPU 41 (the data management unit 304). Further, the compression/expansion controller 204 obtains the data length of compressed target data after the compression processing on the target data. The compression/expansion controller 204 may obtain information related to the data length from a compressing circuit which is provided therein or the memory controller 203 after the compression processing on the target data. The compression/expansion controller 204 calculates the compression rate based on the data length before the compression of the target data and the data length after the compression of the target data (S403). The compression/expansion controller 204 transmits the information related to the calculated compression rate to the CPU 41 (in particular, the format controller 301). The format controller 301 determines a format of the magnetic disk 1 based on the received information related to the compression rate (S404). The format controller 301 transmits the information related to the determined format to the data management unit 304. The data management unit 304 determines a recording position (a physical address) of the compressed target data on the magnetic disk 1 based on the received information related to the format. The data management unit 304 transmits the received information related to the format and the information related to the determined physical address to the write controller 302. The write controller 302 writes the compressed target data for the received physical address in a format based on the received information related with the format. That is, the write controller 302 writes the compressed target data with a new format changed by the format controller 301 (S405).

As described above, according to the HDD 10 according to the embodiment, the plurality of functional units provided in the HDC 50 mainly executes a data read processing, a data compression processing, a processing of changing a format of the magnetic disk 1, and a data write processing according to the control by the plurality of functional units implemented by the CPU 41. Further, some of these processes may be omitted. For example, the HDD 10 according to the embodiment may omit the data compression processing and the processing of changing a format of the magnetic disk 1. That is, both the compressed data and the non-compressed data may be recorded on the magnetic disk 1.

Here, the processes in steps S404 and S405 of FIG. 4 will be described in detail.

In step S404, the format controller 301 changes the format of the magnetic disk 1 based on the information related to the compression rate. In step S405, the write controller 302 writes the compressed target data with a changed new format.

As described above, the data quantity of the compressed data after compression is smaller than the data quantity of the non-compressed data before compression so that the compression rate becomes a value smaller than 1 (100%). That is, the format controller 301 changes the format of the magnetic disk 1 to be relaxed based on the compression rate that is smaller than 1. As described above, the management information related to the compression processing is generated according to the compression processing. The management information is required to be recorded in association with the compressed data. When the management information and the compressed data are recorded on the magnetic disk 1, the management information and the compressed data may be recorded in physically adjacent positions, respectively. For example, the compressed data may be recorded in a position to be read continuously to the position where the management information is recorded. In this case, even when the management information and the compressed data are recorded without changing the format of the magnetic disk 1, a surplus area still exists in which data is not recorded, with respect to an area in which non-compressed data corresponding to the compressed data is recorded. Since the length (size) of a recording region given in each physical address of the magnetic disk 1 is fixed, it is not permitted to record data to be recorded in other physical addresses in this area. When no data is recorded in the surplus area, it means that the recording region of the magnetic disk 1 is not effectively used. Therefore, in order to effectively use the surplus area, the HDD 10 according to the embodiment changes the format of the magnetic disk 1 to be relaxed such that the surplus area does not remain (S404 of FIG. 4). Further, the HDD 10 according to the embodiment records the management information and the compressed data on the magnetic disk 1 in the changed (relaxed) new format (S405 of FIG. 4).

For example, when the length of the target data is a unit data length (which is a unit of data transmission from the host 100, for example, 512 B, 4 KB, or a natural number multiple thereof) of encoding executed in RWC 31, for every unit data of encoding, the format is changed (relaxed) and the management information and the compressed data are recorded. Further, when the length of the target data is a track length of one track or a plurality of tracks, per one or multiple tracks, the format is changed (relaxed) and the management information and the compressed data are recorded. Further, when a length of the target data is one band length in the shingled magnetic recording method, the format is changed (relaxed) from band to band and the management information and the compressed data are recorded.

Specifically, for example, the HDD 10 changes the TPI as a format. This makes the track width wider than the track width before changing the TPI, and as a result, the interference between adjacent tracks and the influence of off-track write may be further reduced during the write processing. Further, the HDD 10 changes the BPI as a format. This causes the number of magnetic elementary particles for every one bit to be increased as compared with the number of magnetic elementary particles before changing the BPI, and as a result, the recorded data may be strongly magnetized and the interference between adjacent tracks or the influence of the off-track write during the write processing may be further reduced. The HDD 10 may change the TPI or the BPI as a format. This enables the writing processing to be executed more stably as compared with a case of solely changing the TPI or solely changing the BPI.

The processes in steps S404 and S405 of FIG. 4 may be executed when an arbitrary condition is satisfied. For example, when the compression rate is higher than a predetermined value (that is, when the value of the compression rate is smaller than a predetermined value), the processes may be executed.

The processes of FIG. 4 are executed in a plurality of following cases. The plurality of following cases may be generated in the HDD 10 using the shingled magnetic recording method. However, an aspect in which the processes of FIG. 4 are executed is not limited to these cases.

Case 1 is a case in which user data recorded in a cache area CA is merged with user data recorded in an arbitrary band and then written in another band. Further, the user data may be written again in the same band in which the user data to be merged is recorded. However, in order to backup original data, it is desirable to write the user data in another band. The user data recorded in the cache area CA is, for example, random data. The random data is a set of data having logical addresses which are not sequentially incremental. In the shingled magnetic recording method, logical addresses of user data recorded in a band are preferably continuous. Accordingly, user data whose logical address length (or a data length) of new user data related to the write command received from the host 100 does not reach the logical address length (or the data length) of one band is treated as random data. The random data is sequentially recorded in the cache area CA in the received order, without having continuity of the logical addresses. However, because the capacity of the cache area CA has an upper limit, the user data (random data) recorded in the cache area CA is required to be appropriately recorded in a band in which the user data is to be finally recorded in order to allocate a space for the cache area CA. The band in which the user data is to be finally recorded is a band which is allocated such that user data corresponding to the logical addresses of the random data recorded in the cache area CA is recorded. In Case 1, the random data is read from the cache area CA to be buffered in the buffer memory 23. Further, at least all of valid user data is read from a band (referred to as a "target band") in which user data corresponding to the logical address of the random data and invalidated is recorded, to be buffered in the buffer memory 23. The user data recorded in the target band may be either compressed data or non-compressed data. The random data and all the valid user data recorded in the target band, which are buffered in the buffer memory 23, are merged and compressed, and then written in a band other than the target band in a newly determined format (relaxed more than a case in which the non-compressed data is recorded).

Case 2 is a case in which user data recorded in an arbitrary band is rewritten in another band. The user data recorded in the arbitrary band may be either compressed data or non-compressed data. Further, the user data may be written again in the band in which the user data is recorded, rather than another band. However, in order to backup original data, it is desirable to write the user data in another band. Case 2 is an example of reading user data from an arbitrary band and writing the read user data in another band, and includes a so-called a data refresh processing. The data refresh processing is a processing of rewriting the user data in another band to recover a quality of user data when it is determined that a quality of user data recorded in the arbitrary band is deteriorated. The data refresh processing may be invoked, for example, when the CPU 41 (data management unit 304) manages the number of recording times in a plurality of tracks in the arbitrary band for every band, and it is detected that the number of recording times exceeds a threshold value. Further, the data refresh processing may be invoked, for example, when the CPU 41 (data management unit 304) detects that the quality of the user data is bad as a result of decoding by the RWC 31 in the HDC 50 during the read processing of the user data recorded in the arbitrary band. In Case 2, the compression/expansion controller 204 executes the compression processing on user data read from the arbitrary band. The user data obtained after the compression processing is written in another band.

Case 3 is a case where new user data related to the write command received from the host 100 is recorded in an arbitrary band. The new user data related to the received write command is buffered in the buffer memory 23. The reception of the write command and the new user data from the host 100 is notified to the CPU 41 (data management unit 304) from the command controller 202 or the memory controller 203. A data quantity recorded in one band for the shingled magnetic recording method is a predetermined amount. Hereinafter, the data quantity is also referred to as a band data quantity. The data management unit 304 is notified that the band data quantity for the arbitrary band is stored in the buffer memory 23, for example, from the command controller 202 or the memory controller 203. According to this notification, the data management unit 304 performs a control such that user data which is stored in the buffer memory 23 and reaches the band data quantity is recorded in the corresponding band. In this case, the compression/expansion controller 204 executes a compression processing on the user data which reaches the band data quantity. The user data obtained after the compression processing is written in an arbitrary band.

Figure 5A:
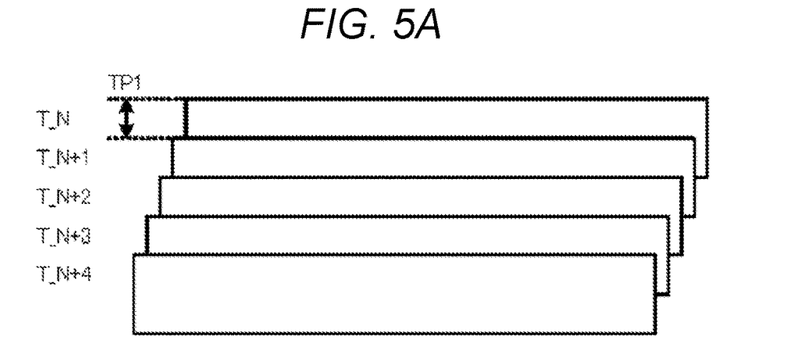
FIGS. 5A and 5B each illustrate a state in which compressed data is recorded according to a changed format in the HDD according to the embodiment.
Figure 5B:
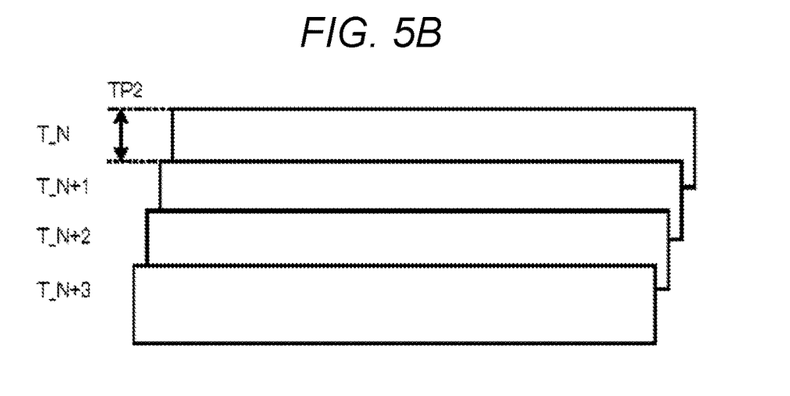

Next, a state when the compressed data is recorded according to a changed format will be explained with reference to FIGS. 5A and 5B. FIGS. 5A and 5B are views illustrating a state when compressed data is recorded according to a changed format in an HDD 10 according to an embodiment. FIGS. 5A and 5B illustrate an example in which TPI is changed as a format.

FIGS. 5A and 5B illustrate an example in which one band includes a plurality of tracks. FIG. 5A illustrates a state in which non-compressed data is recorded in one band and FIG. 5B illustrates a state in which compressed data is recorded in one band. In the HDD 10 according to the embodiment, a track is formed in a substantially circular shape on the magnetic disk 1. However, in FIGS. 5A and 5B, for the convenience of description, a circular track is illustrated as a linear track.

As illustrated in FIG. 5A, the non-compressed data is recorded over a plurality of tracks in an arbitrary band. In FIG. 5A, one band is configured with five tracks including tracks T_N to T_N+4. A part of each track T_N to T_N+3 is recorded to overlap with an adjacent track. That is, in this band, the tracks T_N to T_N+4 are recorded with a track pitch TP1 by the shingled magnetic recording method. The track pitch TP1 corresponds to a distance between edges of adjacent tracks in the same direction or a distance between centers of adjacent tracks. In the example of FIGS. 5A and 5B, when the non-compressed data is written in an arbitrary band, for example, the non-compressed data is compressed at an arbitrary compression rate according to the above-described Case 1 to Case 3. The data quantity of the compressed data is reduced as compared with the data quantity of the non-compressed data by the compression. Further, the TPI is changed (relaxed) according to the compression rate at the time of compression. For example, when the compression rate is 0.8 times (80%), the track pitch is changed to 1/0.8 (approximately 1.25 times). Here, FIGS. 5A and 5B illustrate an example in which the compression rate is 0.8 times (80%). That is, in the band of the rewriting destination illustrated in FIG. 5B, the TPI is relaxed to be more than that of the band of a rewriting origin illustrated in FIG. 5A so that the number of tracks in one band is reduced.

As illustrated in FIG. 5B, the compressed data is recorded over a plurality of tracks in the band of the rewriting destination. In FIG. 5B, one band is configured with four tracks including tracks T_N to T_N+3. A part of each track T_N to T_N+2 is recorded to overlap with an adjacent track. That is, in this band, the tracks T_N to T_N+3 are recorded with a track pitch TP2 by the shingled magnetic recording method. The track pitch TP2 in the band (see FIG. 5B) of the rewriting destination after the change of the format is relaxed to be more than the track pitch TP1 in the band (see FIG. 5A).

That is, according to the HDD 10 according to the embodiment, the format TPI may be relaxed according to a reduced amount of the user data quantity recorded in one band by the compression processing. As the TPI is relaxed, the track pitch is larger than the track pitch before the relaxing of the TPI. Therefore, the interference between adjacent tracks or influence of off-track write may be further reduced. Further, the read processing on the recorded track may be less noisy because of the less interference effect from the adjacent track and hence may improve the reliability of the recorded data.

Further, the HDD 10 according to the embodiment executes the compression processing on one band as one unit (on all data in one band) during the shingled magnetic recording processing. In this case, the HDD 10 generates one piece of management information per one band according to the compression processing. The generated management information is recorded in the band together with the compressed user data. Therefore, because the ratio of the amount of management information to the amount of compressed user data may be reduced as compared with the case in which the compression processing is not executed in the unit of band, the data efficiency in the case of executing the compression processing in the unit of a band may be further improved.

Figure 6A:
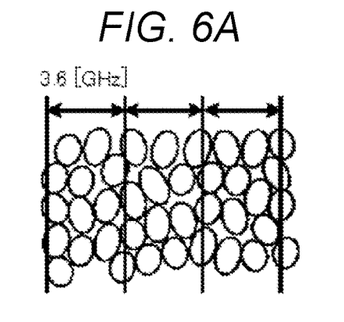
FIGS. 6A and 6B each illustrate another state in which compressed data is recorded according to a changed format in the HDD according to the embodiment.
Figure 6B:
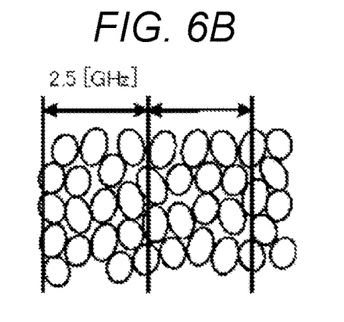

Next, another state will be explained with reference to FIGS. 6A and 6B in which the compressed data is recorded according to a changed format. FIGS. 6A and 6B are views illustrating another state in which compressed data is recorded according to a changed format in the HDD 10 according to the embodiment. FIGS. 6A and 6B illustrate an example in which BPI is changed as a format.

FIGS. 6A and 6B each illustrate a state in which data is recorded in an arbitrary track in a band in a shingled magnetic recording method. FIG. 6A illustrates a state in which non-compressed data is recorded in apart of an arbitrary track in one band and FIG. 6B illustrates a state in which compressed data is recorded in a part of an arbitrary track in a band. In the HDD 10 according to the embodiment, a track is formed in a substantially circular shape on the magnetic disk 1. However, in FIGS. 6A and 6B, for the convenience of description, a circular track is illustrated as a linear track. In FIGS. 6A and 6B, a plurality of grains illustrated in substantially oval shapes represents magnetic elementary particles on a recording surface of the magnetic disk 1.

As illustrated in FIG. 6A, the non-compressed data is recorded in a part of an arbitrary track in a band such that one bit (for example, 1 T) data is recorded by using a write clock of 3.6 GHz. FIG. 6A illustrates an example in which 3 bits of data is recorded. The number of grains in each bit is substantially uniform. In the example of FIGS. 6A and 6B, when the non-compressed data is rewritten in an arbitrary band, for example, the non-compressed data is compressed according to the above-described Case 1 to Case 3. The data quantity of the compressed data is reduced as compared with the data quantity of the non-compressed data by the compression. Further, the BPI is changed (relaxed) according to the compression rate at the time of compression with respect to a format of a band of a rewriting destination. For example, when the compression rate is 0.75 times (75%), the width of grains that represents one bit is changed to 1/0.75 (=approximately 1.33 times). Here, FIGS. 6A and 6B each illustrate an example in which the compression rate is 0.75 times (75%). In this case, as illustrated in FIG. 6B, in a part of the arbitrary track in the band of the rewriting destination, the compressed data is recorded such that the write clock frequency is 2.5 GHz. Also in this case, the number of grains in each bit is substantially uniform. When the write clock frequency is lowered, it corresponds to the fact that a distance (length) of one bit on the recording surface of the magnetic disk 1 per unit time is increased. Since the distribution of magnetic elementary particles on the recording surface of the magnetic disk 1 is uniform, when the distance (length) of one bit is increased, the number of magnetic elementary particles per unit time is increased. In other words, it corresponds to the fact that the number of the magnetic elementary particles per one bit is increased. That is, in a part of the track of the rewriting destination illustrated in FIG. 6B, the BPI is relaxed to have more magnetic elementary particles for one bit than those in a part of the original track illustrated in FIG. 6A.

That is, according to the HDD 10 according to the embodiment, the format (BPI) may be relaxed according to the reduction of the user data quantity recorded in one band by the compression processing. As the BPI is relaxed, the number of magnetic elementary particles per one bit is increased as compared with the number of magnetic elementary particles before the BPI is relaxed. Therefore, during the write processing, the interference between adjacent tracks and influence of an off-track write is further reduced and the magnetized status of each bit may thus become more stable. Further, the read processing on the recorded track may be made more difficult to suffer from the magnetic influence from the adjacent track.

Further, the HDD 10 according to the embodiment executes the compression processing on one band as one unit (on all data in one band) in the shingled magnetic recording processing. In this case, the HDD 10 generates one management information per one band according to the compression processing. The generated management information is recorded in the band together with the compressed user data. Therefore, the ratio of the amount of management information to the amount of compressed user data may be reduced as compared with the case in which the compression processing is not executed in the unit of band. Therefore, data efficiency when the compression processing is executed in the unit of a band may be further improved.

Further, the HDD 10 according to the embodiment executes the compression processing in the unit of one track or a plurality of tracks in one band (on all data in one ora plurality of tracks in one band), during the shingled magnetic recording processing. In this case, the HDD 10 may determine the BPI of each track according to the compression rate per one or multiple tracks. The management information generated per one or multiple tracks may be recorded in one or multiple tracks together with the compressed user data. Therefore, even though tracks have different compression rates, the BPI is set for every track, so that the BPI of a track having a higher compression rate may be more relaxed. Further, the compression processing may be executed not per one or multiple tracks, but per each unit data length (which is a data transmission unit from the host 100, for example, 512 B, 4 KB, or a natural number multiple thereof) of the encoding executed by the RWC 31. In this case, the BPI in an area having a unit data length with a higher compression rate may be more relaxed.

Further, the HDD 10 according to the embodiment may simultaneously change the TPI and the BPI as a format. Therefore, this enables the write processing to be more stably executed as compared with a case of solely changing the TPI or solely changing the BPI.

As described above, according to the HDD 10 according to the embodiment, a plurality of functional units mainly provided in the HDC 50 executes at least one of a data read processing, a data compression processing, a processing of changing a format of the magnetic disk 1, and a data write processing according to the control by the plurality of functional units implemented by the CPU 41. The HDD 10 records data (compressed data) on which the compression processing is executed on the magnetic disk in a new format according to the compression rate on the magnetic disk using the shingled magnetic recording method. The HDD 10 changes (relaxes) the TPI and/or the BPI as a new format. Therefore, according to the embodiment, it is possible to provide a data recording apparatus and a data recording method which are capable of appropriately recording compressed data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data recording apparatus, comprising:
   a disk on which first data are written at a first data recording density according to a shingled magnetic recording (SMR) method;
   a read/write head; and
   a control circuit configured to control the head to perform reading of the first data on the disk and writing of second data to the disk according to the SMR method, wherein
   the second data is a compressed version of the first data, and
   the control circuit performs writing of the second data to the disk at a second data recording density that is less than the first data recording density and is determined according to a data size of the second data.

2. The data recording apparatus according to claim 1, wherein the data recording density is either track density or bit density.

3. The data recording apparatus according to claim 1, wherein the first data is data of a single track.

4. The data recording apparatus according to claim 1, wherein information of the second data recording density is written to the disk along with the second data.

5. A data recording apparatus, comprising:
   a disk;
   a read/write head; and
   a control circuit configured to perform compression of data that is to be written to the disk, determine a data recording density according to a compression ratio of the compressed data, and control the head to perform writing of the compressed data to the disk the determined data recording density,
   wherein the control circuit determines a first data recording density when the compressed data has a first compression ratio, and a second data recording density that is lower than the first data recording density when the compressed data has a second compression ratio that is higher than the first compression ratio.

6. The data recording apparatus according to claim 5, wherein the compressed data is written to the disk by using a shingled magnetic recording method.

7. The data recording apparatus according to claim 5, wherein the data recording density is either track density or bit density.

8. The data recording apparatus according to claim 5, wherein the compressed data is written onto a single track of the disk.

9. The data recording apparatus according to claim 5, wherein information of the data recording density format is written to the disk along with the compressed data.

10. The data recording apparatus according to claim 5, wherein the data to be written is received from a host.

11. A data recording method of a data recording apparatus including a disk and a read/write head, the method comprising:
    compressing first data, which is data to be written to the disk, to generate second data;
    determining a data recording density at which the second data is to be written to the disk, according to a compression ratio of the first data to the second data; and
    writing the second data to the disk at the determined data recording density,
    wherein a first data recording density is determined when the compression ratio is a first compression ratio, and a second data recording density that is lower than the first data recording density is determined when the compression ratio is a second compression ratio that is higher than the first compression ratio.

12. The method according to claim 11, wherein the second data is written to the disk by using a shingled magnetic recording method.

13. The method according to claim 11, wherein the data recording density is either track density or bit density.

14. The method according to claim 11, wherein information of the determined format is written to the disk along with the second data.

15. A data recording apparatus, comprising:
    a disk;
    a read/write head; and
    a control circuit configured to control the head to perform reading of first data on the disk according to a first format and writing of second data to the disk according to a second format, wherein
    the control circuit is configured to control the head to perform reading of third data and combine the first data and the third data, and the second data is generated by compressing at least a part of the combined data of the first data and the third data, and
    the second format is determined according to a data size of the second data.

16. The data recording apparatus according to claim 15, wherein the second data is written to the disk by using a shingled magnetic recording method.

17. The data recording apparatus according to claim 16, wherein the first data is data of a first band and the second data is written to a second band.

18. The data recording apparatus according to claim 15, wherein the first and second formats each correspond to a data recording density, the data recording density specified by the first format being greater than that of the second format.

19. The data recording apparatus according to claim 18, wherein the data recording density is either track density or bit density.

20. The data recording apparatus according to claim 15, wherein the first data is data of a single track, and information of the second format is written to the disk along with the second data.

* * * * *